United States Patent
Scanlon et al.

(10) Patent No.: US 10,359,187 B2
(45) Date of Patent: Jul. 23, 2019

(54) HEATING UNIT WITH LEDS AND VENTING

(71) Applicant: Hatco Corporation, Milwaukee, WI (US)

(72) Inventors: John Scanlon, Milwaukee, WI (US); Kevin Veeser, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 207 days.

(21) Appl. No.: 15/595,572

(22) Filed: May 15, 2017

(65) Prior Publication Data

US 2017/0325629 A1    Nov. 16, 2017

Related U.S. Application Data

(60) Provisional application No. 62/337,045, filed on May 16, 2016.

(51) Int. Cl.
| | |
|---|---|
| *F21V 7/00* | (2006.01) |
| *F21V 29/83* | (2015.01) |
| *A47J 36/24* | (2006.01) |
| *F21V 33/00* | (2006.01) |
| *F21Y 115/10* | (2016.01) |

(52) U.S. Cl.
CPC ............ *F21V 29/83* (2015.01); *A47J 36/2488* (2013.01); *F21V 33/0092* (2013.01); *F21V 33/0044* (2013.01); *F21Y 2115/10* (2016.08)

(58) Field of Classification Search
CPC ................................................. A47J 36/2488
USPC ........................................ 392/423, 424, 425
See application file for complete search history.

(56) References Cited

U.S. PATENT DOCUMENTS

| | | | | |
|---|---|---|---|---|
| 1,686,865 | A * | 10/1928 | Klotz ...................... | F24C 7/065 |
| | | | | 219/530 |
| 2,590,417 | A * | 3/1952 | Jones ...................... | F24C 7/065 |
| | | | | 338/316 |
| 2,678,372 | A * | 5/1954 | Salton .................. | F21V 33/0092 |
| | | | | 219/220 |
| 3,089,940 | A * | 5/1963 | Norton .................... | F24C 7/065 |
| | | | | 219/552 |

(Continued)

FOREIGN PATENT DOCUMENTS

WO    WO2015119390 A1 *  8/2015  ........... H05B 3/0085

*Primary Examiner* — Umashankar Venkatesan
(74) *Attorney, Agent, or Firm* — Foley & Lardner LLP (57) ABSTRACT

A heating unit includes a housing defining a thermal cavity and has a first longitudinal edge and an opposing second longitudinal edge, a reflector assembly disposed within the thermal cavity, a heating element, and a lighting element. The housing defines a vent positioned at least one of laterally between a central longitudinal plane of the housing and the first longitudinal edge and laterally between the central longitudinal plane and the opposing second longitudinal edge. The reflector assembly is coupled to an interior surface of the housing. A spacer is positioned between the reflector assembly and the interior surface forming an air gap therebetween. The heating element extends within the central longitudinal plane and is at least partially surrounded by the reflector assembly. The lighting element is positioned along at least one of the first longitudinal edge and the opposing second longitudinal edge such that the vent is positioned laterally between the lighting element and the heating element.

17 Claims, 10 Drawing Sheets

(56) References Cited

U.S. PATENT DOCUMENTS

| | | | | |
|---|---|---|---|---|
| 3,152,241 A | * | 10/1964 | Ammerman | F24C 7/065 |
| | | | | 338/316 |
| 3,731,055 A | * | 5/1973 | Kerchner, Jr. | A01K 31/20 |
| | | | | 219/521 |
| 3,733,461 A | * | 5/1973 | Rohats | F24C 7/065 |
| | | | | 250/493.1 |
| 6,188,836 B1 | * | 2/2001 | Glucksman | F24B 7/005 |
| | | | | 392/373 |
| 2016/0381733 A1 | * | 12/2016 | Lee | F24C 7/06 |
| | | | | 362/92 |

* cited by examiner

HEATING UNIT WITH LEDS AND VENTING

CROSS-REFERENCE TO RELATED PATENT APPLICATIONS

This application claims the benefit of U.S. Provisional Patent Application No. 62/337,045, filed May 16, 2016, which is incorporated herein by reference in its entirety.

BACKGROUND

Food products may need to be maintained at a certain temperature (e.g., before being served to a customer, etc.). For example, many food products need to be maintained in a certain temperature range to provide a desired eating experience or to comply with food safety regulations. Food products are traditionally maintained at a desired temperature using a unit that provides a temperature-controlled environment. The unit may include one or more heating elements.

SUMMARY

One embodiment relates to a heating unit. The heating unit includes a housing defining a thermal cavity and has a first longitudinal edge and an opposing second longitudinal edge, a reflector assembly disposed within the thermal cavity, a heating element, and a lighting element. The housing defines a vent positioned at least one of (i) laterally between a central longitudinal plane of the housing and the first longitudinal edge and (ii) laterally between the central longitudinal plane and the opposing second longitudinal edge. The reflector assembly is coupled to an interior surface of the housing. A spacer is positioned between the reflector assembly and the interior surface forming an air gap therebetween. The heating element extends within the central longitudinal plane and is at least partially surrounded by the reflector assembly. The lighting element is positioned along at least one of (i) the first longitudinal edge and (ii) the opposing second longitudinal edge such that the vent is positioned laterally between the lighting element and the heating element.

Another embodiment relates to a heating unit. The heating unit includes a housing defining a thermal cavity, a reflector assembly disposed within the thermal cavity and coupled to an interior surface of the housing, a heating element disposed within the thermal cavity and at least partially surrounded by the reflector assembly, and a lighting element at least partially disposed within the thermal cavity. The lighting element includes a plurality of light emitting diodes.

Still another embodiment relates to a heating unit. The heating unit includes a housing defining a central longitudinal plane, a first reflector, a second reflector, a heating element, a first lighting element, and a second lighting element. The housing includes a cover, a first flange, and a second flange. The cover has a first longitudinal edge and an opposing second longitudinal edge. The cover defines (i) a first vent positioned laterally between the central longitudinal plane and the first longitudinal edge and (ii) a second vent positioned laterally between the central longitudinal plane and the opposing second longitudinal edge. The first flange extends along the first longitudinal edge. The second flange extends along the opposing second longitudinal edge. The first reflector is coupled to an interior surface of the cover. A first plurality of spacers are positioned between the first reflector and the interior surface forming a first air gap therebetween. The second reflector is coupled to the first reflector. A second plurality of spacers are positioned between the second reflector and the first reflector forming a second air gap therebetween. The heating element extends within the central longitudinal plane and is at least partially surrounded by the second reflector. The first lighting element is coupled to the first flange such that the first vent is positioned laterally between the first lighting element and the heating element. The second lighting element is coupled to the second flange such that the second vent is positioned laterally between the second lighting element and the heating element. According to an exemplary embodiment, the first lighting element and the second lighting element include a plurality of light emitting diodes.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a heating unit (e.g., a food warmer, etc.) includes a heating element. The heating element is configured to provide thermal energy to a food product positioned below the heating unit within a heating area. Traditional heating units may include a light source (e.g., incandescent lights, fluorescent lights, etc.) positioned to illuminate the heating area.

According to an exemplary embodiment, the heating unit of the present disclosure includes light emitting diode (LED) lighting, a housing, and a reflector assembly that facilitate operating the heating unit with LEDs. The reflector assembly (e.g., a dual reflector assembly, etc.) is coupled to the housing along a longitudinal centerline of the heating unit (e.g., within a central longitudinal plane thereof, etc.) with an air gap formed therebetween. The reflector assembly is configured to at least partially surround the heating element. According to an exemplary embodiment, the reflector assembly is configured to direct (e.g., reflect, redirect, etc.) a portion of the heat generated (e.g., emitted, etc.) by the heating element towards the heating zone. The housing may define one or more vents positioned laterally outward relative to the heating element and reflector assembly. The LEDs may be positioned further laterally outward than the one or more vents (e.g., such that the one or more vents are positioned laterally between the heating element and the LEDs, etc.). According to an exemplary embodiment, the reflector assembly, the air gap, and/or the vents are positioned to thermally isolate the LEDs from the heat generated by the heating element, thereby maintaining the temperature of the LEDs within a suitable operating temperature range.

Figure 1:
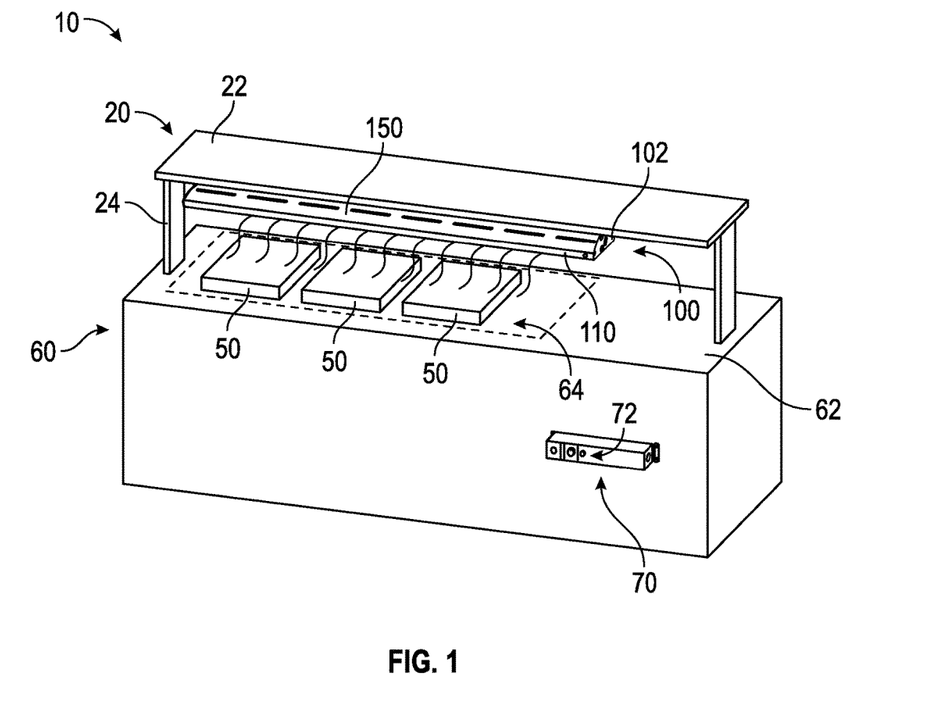
FIG. 1 is a perspective view of a heating system including a heating unit, according to an exemplary embodiment.
Figure 2:
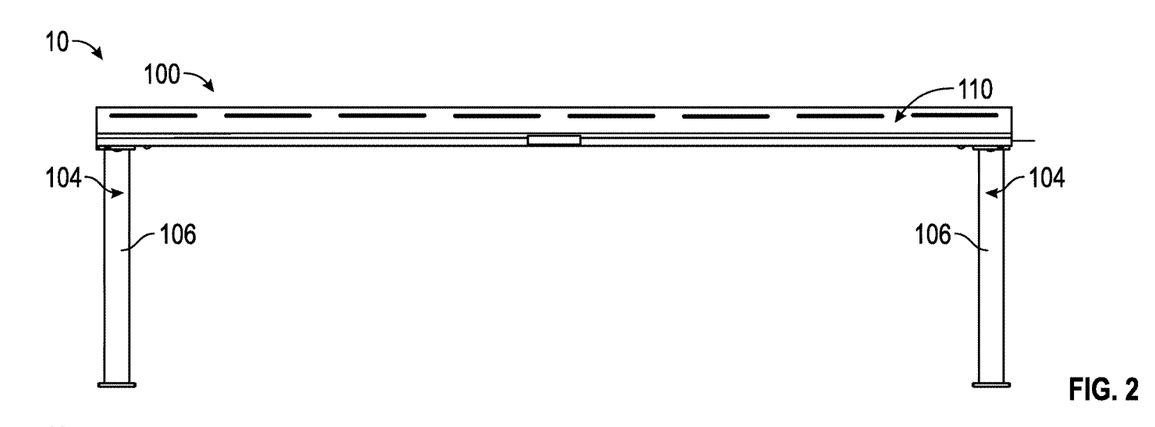
FIGS. 2 and 3 are front plan views of a heating system, according to another exemplary embodiment.
Figure 3:
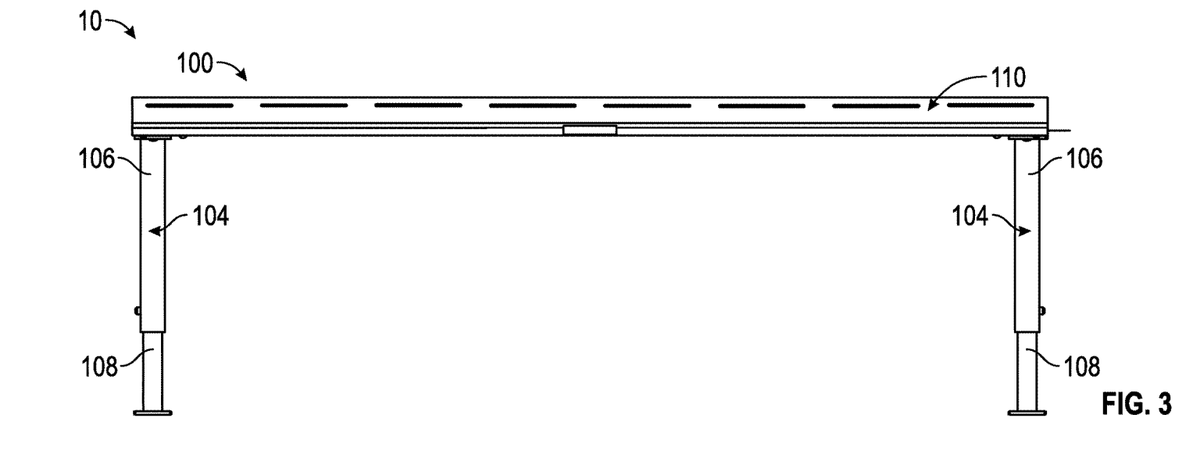

According to the exemplary embodiment shown in FIGS. 1-3, a thermal regulation system, shown as heating system 10, includes a heating unit, shown as warmer 100. As shown in FIG. 1, the heating system 10 includes a heating assembly, shown as heating assembly 20, and a base, shown as heating base 60. The heating assembly 20 includes a shelf, shown as shelf 22, and legs, shown as stands 24. As shown in FIG. 1, the warmer 100 is coupled to the shelf 22 with brackets, shown as mounting brackets 102. In other embodiments, the warmer 100 is coupled to another surface (e.g., a ceiling, a cabinet, etc.) with the mounting brackets 102. In an alternative embodiment, the warmer 100 is suspended from the shelf 22 or another surface (e.g., ceiling, cabinet, etc.) with wires, cables, chains, or another system. According to an exemplary embodiment, the stands 24 are sized to position the warmer 100 a target distance above the heating base 60. In other embodiments, the stands 24 are adjustable to facilitate selectively repositioning the warmer 100 and/or the shelf 22 a distance from the heating base 60. The stands 24 may be rectangular, square, tubular, etc. and are configured to conceal electrical wiring connected to the warmer 100 (e.g., to power a heating element of the warmer 100, to power a light source of the warmer 100, etc.). According to the exemplary embodiment shown in FIG. 1, the stands 24 are fixed to the heating base 60. In some embodiments, the entire heating system 10 is selectively repositionable (e.g., the heating base 60 includes wheels, etc.). According to alternative embodiments, the stands 24 are not coupled to the heating base 60 (e.g., the heating assembly 20 is not fixed to the heating base 60, the heating assembly 20 is repositionable, etc.).

According to the exemplary embodiment shown in FIGS. 2 and 3, the heating system 10 does not includes the heating assembly 20 (e.g., the shelf 22 and the stands 24 are omitted, etc.) and the warmer 100 does not include the mounting brackets 102. As shown in FIGS. 2 and 3, the warmer 100 includes a pair of stands, shows as stands 104, directly coupled to the warmer 100. As shown in FIGS. 2 and 3, the stands 104 includes a first member, shown as outer tube 106, and a second member, shown as inner tube 108. According to an exemplary embodiment, the inner tube 108 is configured to extend from and retract into the outer tube 106 such that the stands 104 facilitate selectively adjusting the height of the warmer 100 relative to a support surface (e.g., the heating base 60, a counter, etc.). In an alternative embodiment, the stands 104 are non-adjustable (i.e., have a fixed length to position the warmer 100 a target distance from the heating base 60). In some embodiments, the stands 104 are structured as "C-leg" stands (e.g., C-shaped, etc.) or "T-leg" stands (e.g., T-shaped, etc.) and configured to facilitate installation and stability of the warmer 100 onto any surface (e.g., counter, table, the heating base 60, etc.).

As shown in FIG. 1, the heating base 60 provides a surface, shown as heating surface 62, upon which a product (e.g., plate, food product, drink, etc.), shown as product 50, is heated by warmer 100 during a heating operation (and/or cooled during a cooling operation). As shown in FIG. 1, the heating surface 62 is substantially rectangular in shape. In other embodiments, the heating surface 62 has a different shape (e.g., oval-shaped, square, circular, hexagonal, etc.). As shown in FIG. 1, the heating surface 62 is substantially flat. In other embodiments, the heating surface 62 is not flat (e.g., curved, etc.). By way of example, the heating surface 62 may define one or more depressions (e.g., grooves, indents, valleys, etc.) positioned along the heating base 60. The depressions may allow a user (e.g., chef, cook, staff, owner, etc.) to separate or arrange various items (e.g., hot and cold items, solid and liquid items, align sandwiches or ice cream bars, etc.). For example, one depression may receive a liquid-based food product (e.g., soup, etc.), and another depression may receive a solid-based food product (e.g., sandwiches, pasta, etc.). In one embodiment, one depression and/or section of the heating surface 62 is heated while another depression and/or section is cooled.

As shown in FIG. 1, the warmer 100 includes a housing, shown as housing 110. The housing 110 is configured to receive a thermal element, shown as heating element 150. The heating element 150 is configured to provide thermal energy (e.g., heat, etc.) to the product(s) 50 positioned beneath the warmer 100 within a region, shown as heating zone 64. According to an exemplary embodiment, the thermal energy provided by the heating element 150 maintains a target temperature (or target temperature range) of the product(s) 50 within the heating zone 64 (e.g., to provide a desired eating experience, to comply with food safety regulations, etc.). In some embodiments, the warmer 100 includes a plurality of heating elements 150 such that the warmer 100 may provide varying amounts of thermal energy across the heating zone 64 (e.g., different temperature zones within the heating zone 64, etc.).

According to an exemplary embodiment, the heating element 150 includes a resistive heating element used to perform at least a portion of the heating operation of the warmer 100 (e.g., through radiative heat transfer, etc.). The heating element 150 may be flexible and/or adaptable to any configuration (e.g., shape, layout, etc.) of the housing 110. The resistive heating element may receive electrical current (i.e., electrical energy) that is passed through the heating element 150 to generate thermal energy (e.g., heat, etc.). In other embodiments, the heating element 150 includes a different type of heating element (e.g., coiled, tubular, non-flexible, etc.). The heating element 150 receives a heated working fluid as part of the heating operation, according to an alternative embodiment. In alternate embodiments, the warmer 100 additionally or alternatively includes a convective element (e.g., a blower, a fan, etc.) to provide convective heat transfer (e.g., a heated air stream, etc.) to perform at least a portion of the heating operation of the warmer 100. In yet another embodiment, the heating surface 62 absorbs and retains heat provided by the warmer 100 such that the product(s) 50 within the heating zone 64 may be further heated with conductive heat transfer. Thus, the warmer 100 may provide thermal energy to the product(s) 50 within the heating zone 64 through radiative heat transfer, convective heat transfer, conductive heat transfer, or any combination thereof.

According to an alternative embodiment, the thermal element is configured as a cooling element (e.g., in place of or in combination with a heating element, etc.). For example, the thermal element may be or include a refrigerant coil that is used in a refrigeration cycle to perform a cooling operation on the product(s) 50. By way of example, a refrigerant coil may be used along with a working fluid (e.g., a refrigerant such as R-134a, etc.) in a refrigeration cycle. The working fluid may flow through the refrigerant coil and absorbs thermal energy (e.g., evaporation, etc.) from a surrounding environment, the product(s) 50, and/or the heating base 60, reducing the temperature thereof. The absorbed thermal energy (e.g., heat, etc.) may be rejected into the surrounding environment (e.g., room, air, etc.) through the remaining steps in the refrigeration cycle (e.g., compression, condensation, expansion, etc.). In other embodiments, the cooling element includes another type of cooling element (e.g., thermoelectric cooler, etc.).

As shown in FIG. 1, the heating system 10 includes a control unit, shown as controller 70, configured to control the warmer 100. In one embodiment, a user may control the heating system 10 with an interface, shown as user interface 72 of the controller 70. The controller 70 may be communicably coupled to various components of the warmer 100 (e.g., the heating element 150, a lighting element, etc.), such that information and/or signals (e.g., command signals, etc.) may be provided to and/or from the controller 70. The information and/or signals may relate to one or more components of the warmer 100. According to the exemplary embodiment shown in FIG. 1, the controller 70 is located remotely from the warmer 100. In other embodiments, the controller 70 is directly coupled to the housing 110 of the warmer 100.

Figure 4:
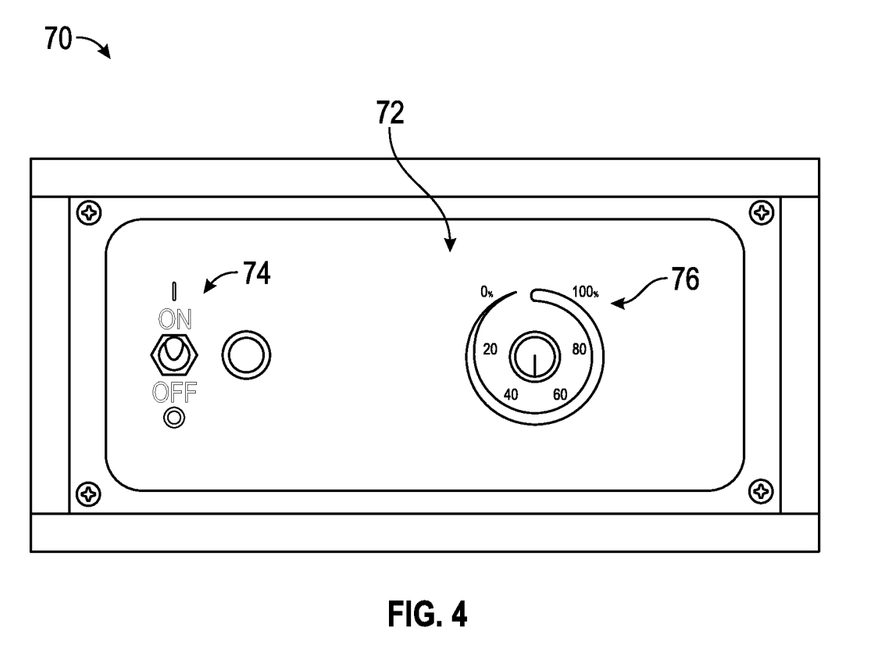
FIG. 4 is detailed view of a controller unit of the heating unit of FIG. 1, according to an exemplary embodiment.
Figure 5:
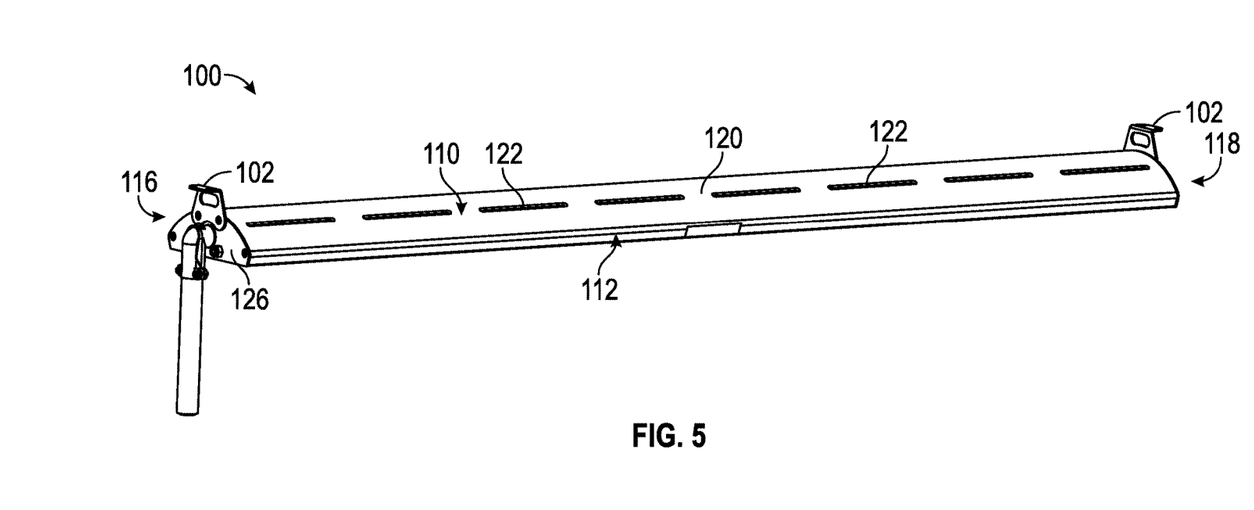
FIG. 5 is a front perspective view of the heating unit of FIG. 1, according to an exemplary embodiment.
Figure 6:
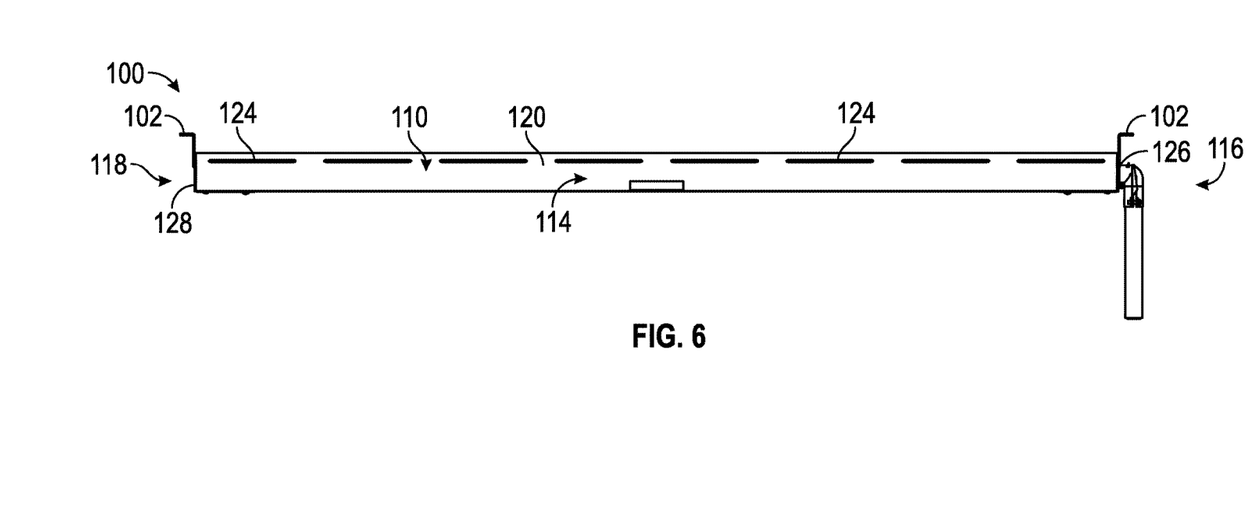
FIG. 6 is a rear plan view of the heating unit of FIG. 1, according to an exemplary embodiment.
Figure 7:
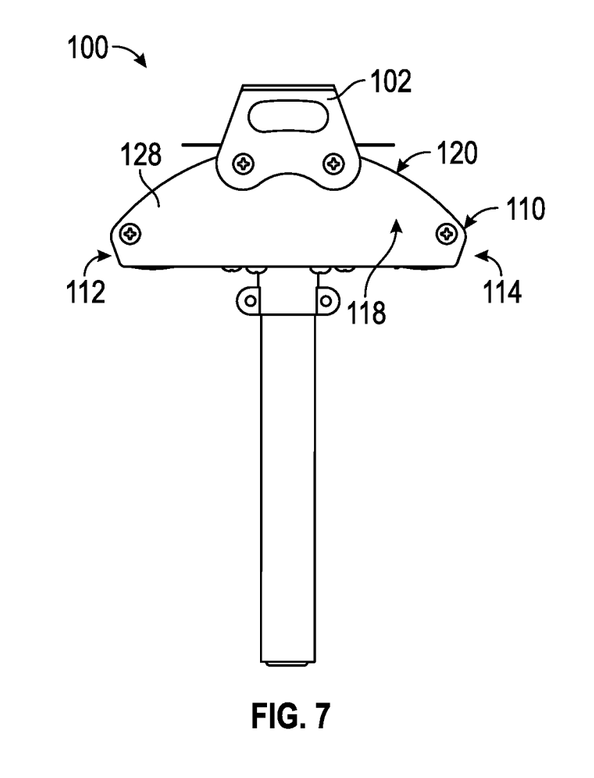
FIG. 7 is a left plan view of the heating unit of FIG. 1, according to an exemplary embodiment.
Figure 8:
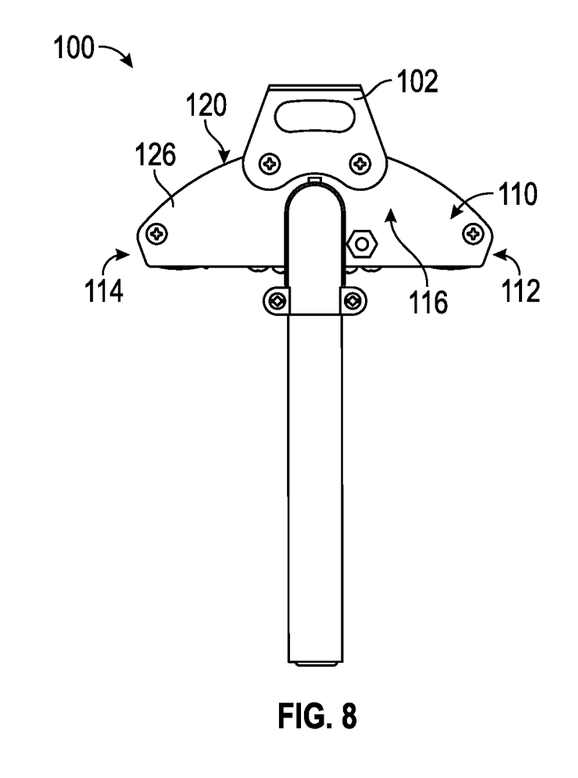
FIG. 8 is a right plan view of the heating unit of FIG. 1, according to an exemplary embodiment.
Figure 9:
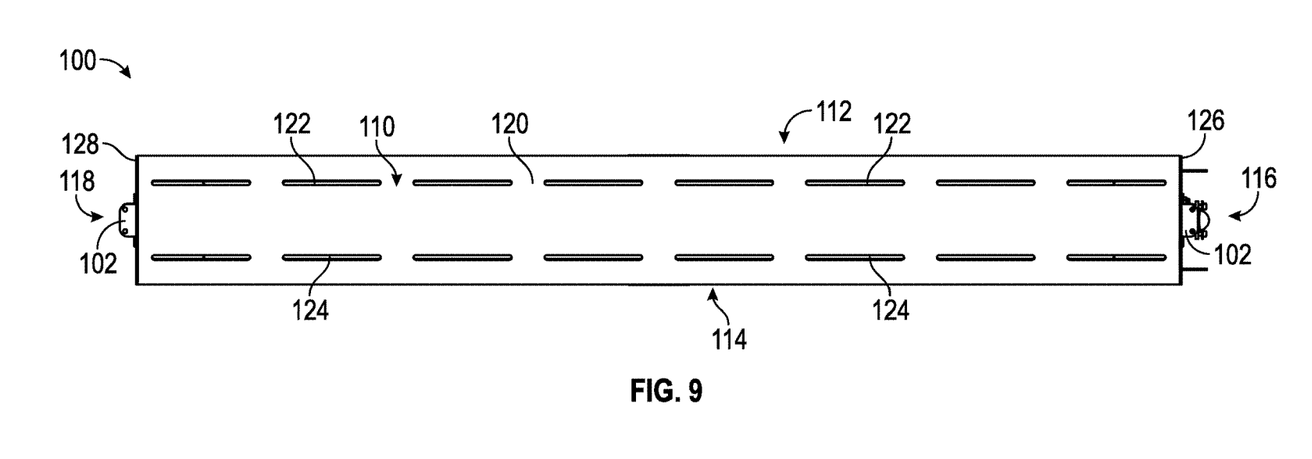
FIG. 9 is a top plan view of the heating unit of FIG. 1, according to an exemplary embodiment.

According to an exemplary embodiment, the user interface 72 facilitates communication between an operator (e.g., cook, chef, staff member, etc.) of the warmer 100 and one or more components (e.g., the heating element 150, lighting elements, etc.) of the warmer 100. By way of example, the user interface 72 may include at least one of an interactive display, a touchscreen device, one or more buttons (e.g., a stop button configured to turn the unit off, buttons allowing a user to set a target temperature, buttons to turn a lighting element on and off, etc.), and switches. In one embodiment, the user interface 72 includes a notification device (e.g., alarm, light, display, etc.) that notifies the operator when the warmer 100 is on, off, in a standby mode, and/or in an heating mode. As shown in FIG. 4, the user interface 72 includes an on/off switch 74 and a temperature dial 76. According to an exemplary embodiment, a user may interact with the on/off switch 74 to turn the warmer 100 on or off. According to another exemplary embodiment, a user may interact with the temperature dial 76 to enter a desired operating setpoint (e.g., a power level, an operating temperature, etc.) for the operation of the warmer 100. In another embodiment, a display shows a current temperature of the heating element 150, a current temperature of the heating zone 64, a target temperature (e.g., of the heating zone 64, of the products 50, of the heating element 150, etc.), and/or a time until the target temperature is reached.

Figure 10:
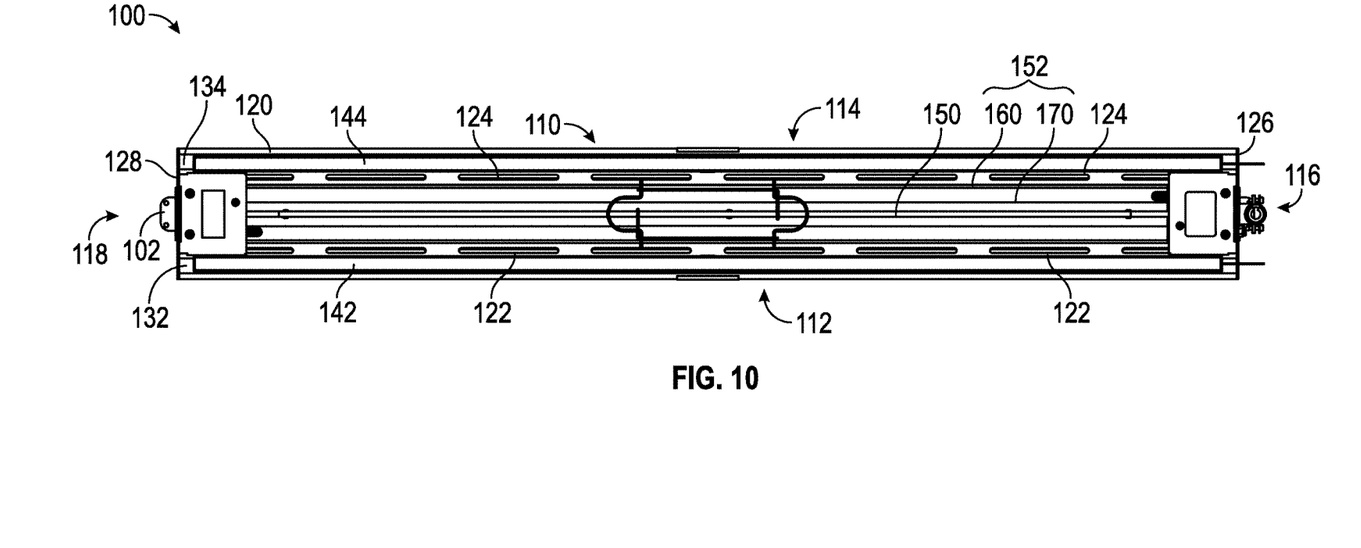
FIG. 10 is a bottom plan view of the heating unit of FIG. 1, according to an exemplary embodiment.
Figure 11:
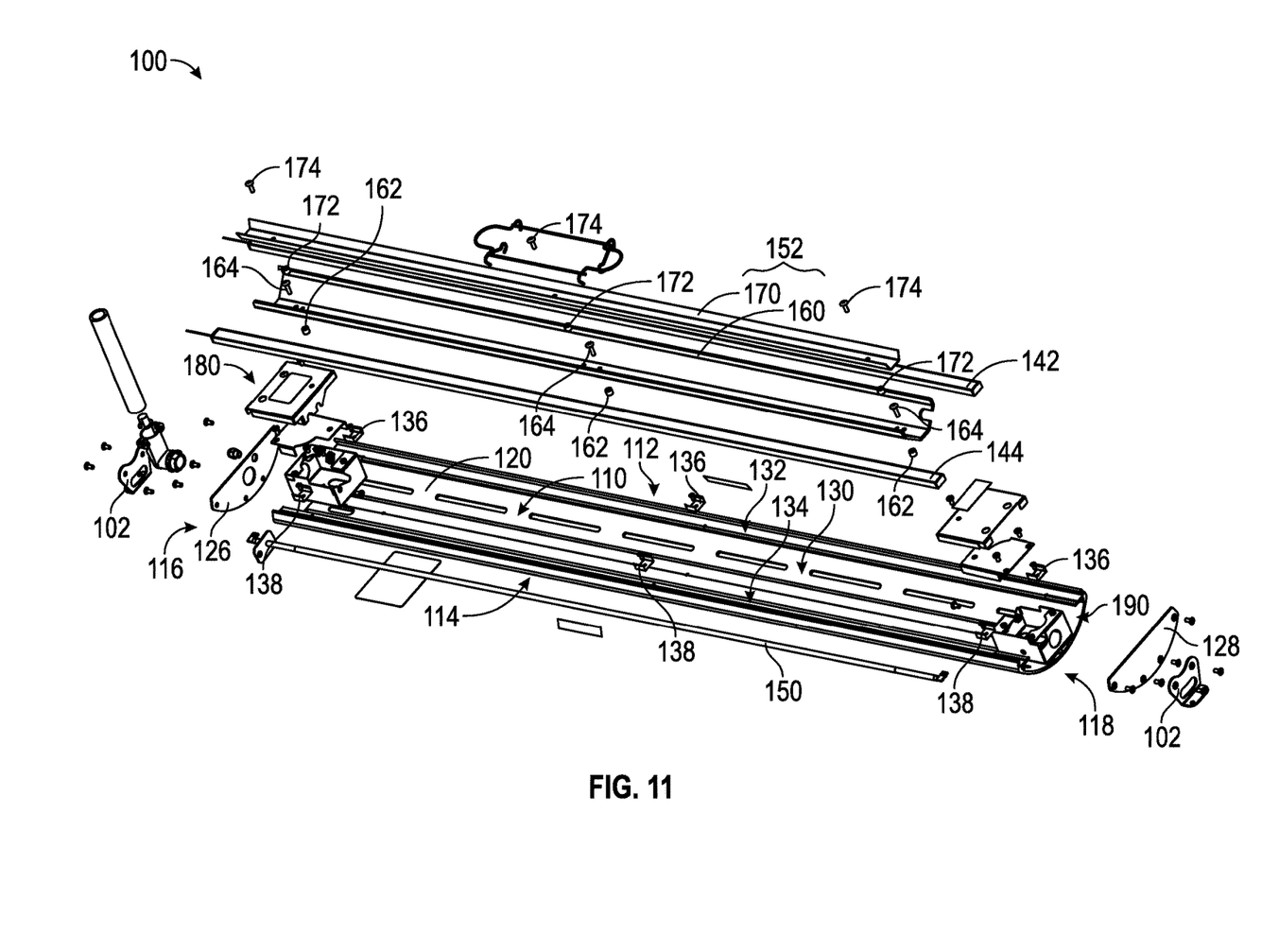
FIG. 11 is a bottom perspective exploded view of the heating unit of FIG. 1, according to an exemplary embodiment.
Figure 12:
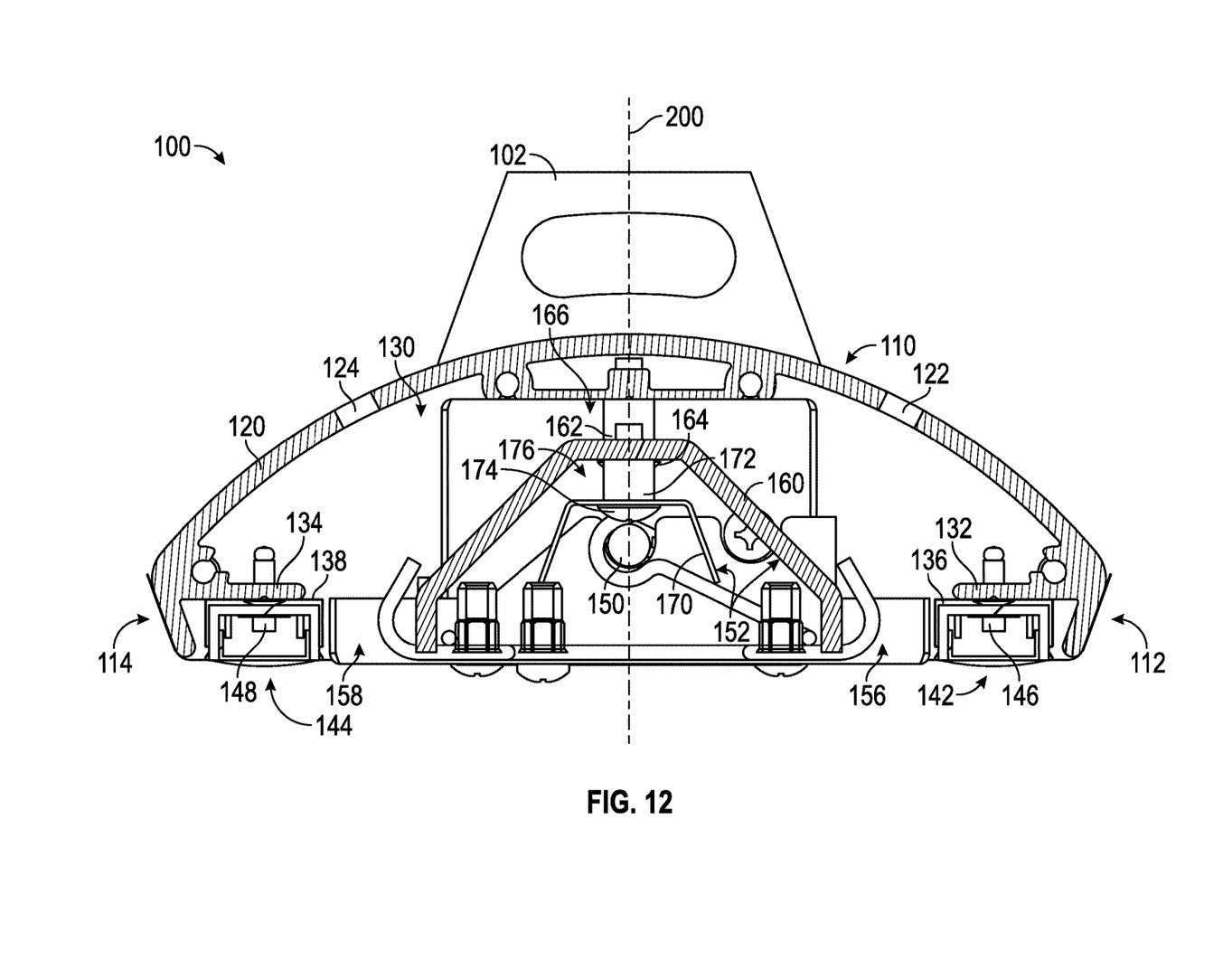
FIG. 12 is a detailed side cross-sectional view of the heating unit of FIG. 1, according to an exemplary embodiment.

According to the exemplary embodiment shown in FIGS. 5-14, the warmer 100 includes the housing 110, a pair of lighting elements, shown as first lighting element 142 and second lighting element 144, the heating element 150, and a reflector assembly, shown as reflector assembly 152. In other embodiments, the warmer 100 includes only one lighting element (e.g., one strip of LEDs, etc.). As shown in FIGS. 5-14, the housing 110 includes a cover, shown as cover 120. The cover 120 has a first longitudinal side, shown as first longitudinal edge 112, an opposing second longitudinal side, shown as second longitudinal edge 114, a first end, shown as first end 116, and an opposing second end, shown as second end 118. According to the exemplary embodiment shown in FIGS. 5-14, the cover 120 has a domed-shaped profile. In other embodiments, the cover 120 has a rectangular profile, a square profile, a pitched profile (e.g., pentagon shaped, etc.), a trapezoidal profile, or still another profile. As shown in FIGS. 5-11, the warmer 100 includes a pair of end caps, shown as first end cap 126 and second end cap 128, coupled to the first end 116 and the second end 118 of the cover 120, respectively. As shown in FIGS. 11-12, the cover 120, the first end cap 126, and the second end cap 128 cooperatively define an internal cavity, shown as thermal cavity 130. As shown in FIGS. 5-11, a mounting bracket 102 is coupled (e.g., fastened, etc.) to each of the first end cap 126 and the second end cap 128 (e.g., to facilitate hanging the warmer 100 from a shelf, cabinet, etc.).

As shown in FIGS. 10-14, the housing 110 includes a first longitudinal ledge, shown as first flange 132, that extends along the first longitudinal edge 112 of the cover 120 and a second longitudinal ledge, shown as second flange 134, that extends along the second longitudinal edge 114 of the cover 120. According to an exemplary embodiment, the first flange 132 and the second flange 134 extend at least partially laterally inward from the first longitudinal edge 112 and the second longitudinal edge 114, respectively, into the thermal cavity 130. In one embodiment, the cover 120, the first flange 132, and the second flange 134 are integrally formed to define a single, unitary housing 110 (e.g., an extruded housing, etc.). In other embodiment, the first flange 132 and/or the second flange 134 are coupled (e.g., fastened, riveted, screwed, welded, glued, etc.) to the first longitudinal edge 112 and/or the second longitudinal edge 114 of the cover 120, respectively.

As shown in FIG. 12, the housing 110 defines a central longitudinal plane, shown as central plane 200. In one embodiment, the central plane 200 extends along a longitudinal centerline of the housing 110. The heating element 150 extends within the central plane 200 (e.g., defining the longitudinal centerline of the housing 110, etc.), according to an exemplary embodiment. As shown in FIGS. 10-12, the reflector assembly 152 includes a first reflector, shown as first heat reflector 160, and a second reflector, shown as second heat reflector 170. In some embodiments, the reflector assembly 152 does not include first heat reflector 160. In some embodiments, the reflector assembly 152 does not include the second heat reflector 170. As shown in FIG. 12, the reflector assembly 152 is disposed within the thermal cavity 130 and coupled to the cover 120. The reflector assembly 152 (e.g., the second heat reflector 170, etc.) at least partially surrounds the heating element 150 (e.g., the heating element 150 is disposed within and at least partially surrounded by the second heat reflector 170, etc.). According to an exemplary embodiment, the reflector assembly 152 is configured to reflect and/or redirect a portion of the heat generated (e.g., emitted, etc.) by the heating element 150 towards the heating zone 64.

As shown in FIGS. 11 and 12, the first heat reflector 160 is coupled to an interior surface of the cover 120 with a first plurality of spacers, shown as first standoffs 162, and a first plurality of fasteners, shown as first fasteners 164. As shown in FIG. 12, the first standoffs 162 are positioned between the first heat reflector 160 and the interior surface of the cover 120 forming a first air gap, shown as first air gap 166, therebetween. As shown in FIG. 12, the second heat reflector 170 is disposed within a channel of the first heat reflector 160 (e.g., the second heat reflector 170 is at least partially surrounded by the first reflector 160, etc.). As shown in FIGS. 11 and 12, the second heat reflector 170 is coupled to the first heat reflector 160 with a second plurality of spacers, shown as second standoffs 172, and a second plurality of fasteners, shown as second fasteners 174. As shown in FIG. 12, the second standoffs 172 are positioned between the first heat reflector 160 and the second heat reflector 170 forming a second air gap, shown as second air gap 176, therebetween.

As shown in FIGS. 5, 6, 9, 10, and 12, the cover 120 defines a first plurality of vents, shown as first vents 122, and a second plurality of vents, shown as second vents 124. As shown in FIG. 12, the first vents 122 are positioned laterally between (i) the central plane 200 (e.g., the heating element 150, the reflector assembly 152, etc.) and (ii) the first longitudinal edge 112 and the first flange 132 (e.g., the first vents 122 are positioned laterally outward relative to the heating element 150 and the reflector assembly 152, etc.). As shown in FIG. 12, the second vents 124 are positioned laterally between (i) the central plane 200 (e.g., the heating element 150, the reflector assembly 152, etc.) and (ii) the second longitudinal edge 114 and the second flange 134 (e.g., the second vents 124 are positioned laterally outward relative to the heating element 150 and the reflector assembly 152, etc.). According to the exemplary embodiment shown in FIGS. 5, 6, 9, and 10, the first vents 122 and the second vents 124 extend longitudinally between the first end 116 and the second end 118 of the cover 120. In other embodiments, the first vents 122 and the second vents 124 extend laterally and/or diagonally between the first longitudinal edge 112 and the second longitudinal edge 114 of the cover 120. As shown in FIGS. 5, 6, 9, 10, the first vents 122 and the second vents 124 are elongated slots. In other embodiments, the first vents 122 and/or the second vents 124 have another shape (e.g., circular, etc.). In an alternative embodiment, the first vents 122 and/or the second vents 124 form a single, continuous elongated vent that extends at least a portion of the longitudinal length of the cover 120.

As shown in FIGS. 10-14, the first lighting element 142 is coupled to the first flange 132 with a first plurality of couplers, shown as first clips 136 (e.g., such that the first lighting element 142 is at least partially disposed within the thermal cavity 130, etc.). The first lighting element 142 is thereby positioned further laterally outward than the first vents 122 such that the first vents 122 are positioned laterally between the first lighting element 142 and the heating element 150. As shown in FIG. 12, the first lighting element 142 is spaced a distance from the reflector assembly 152, forming a third air gap, shown as third air gap 156, therebetween. As shown in FIGS. 10-14, the second lighting element 144 is coupled to the second flange 134 with a second plurality of couplers, shown as second clips 138 (e.g., such that the second lighting element 144 is at least partially disposed within the thermal cavity 130, etc.). The second lighting element 144 is thereby positioned further laterally outward than the second vents 124 such that the second vents 124 are positioned laterally between the second lighting element 144 and the heating element 150. As shown in FIG. 12, the second lighting element 144 is spaced a distance from the reflector assembly 152, forming a fourth air gap, shown as fourth air gap 158, therebetween.

As shown in FIG. 12, the first lighting element 142 includes one or more first light sources, shown as first light sources 146, disposed within and/or along the first lighting element 142. According to an exemplary embodiment, the first light sources 146 include LEDs. In other embodiments, the first light sources 146 include another type of light source (e.g., fluorescent, incandescent, etc.). As shown in FIG. 12, the second lighting element 144 includes one or more second light sources, shown as second light sources 148, disposed within and/or along the second lighting element 144. According to an exemplary embodiment, the second light sources 148 include LEDs. In other embodiments, the second light sources 148 include another type of light source (e.g., fluorescent, incandescent, etc.). According to an exemplary embodiment, the first lighting element 142 and the second lighting element 144 are positioned to illuminate the heating zone 64. In some embodiments, the warmer 100 does not include one of the first lighting element 142 and the second lighting element 144. In an alternative embodiment, the first lighting element 142 and the second lighting element 144 form a single, continuous lighting element that extends around the periphery of the cover 120.

By way of example, higher temperatures may reduce light output from and potentially shorten the useful life of the first light source 146 and the second light source 148, particularly in embodiments where such light sources include LEDs. The housing 110 provides a cooler ambient environment (e.g., within the thermal cavity 130, etc.), increasing LED light output and the useful life of the LEDs.

According to an exemplary embodiment, the reflector assembly 152, the first air gap 166, the second air gap 176, the third air gap 156, the fourth air gap 158, the first vents 122, and/or the second vents 124 are positioned to thermally isolate the first light sources 146 and the second light sources 148 from the heat generated by the heating element 150. By way of example, the first heat reflector 160 and the second heat reflector 170 may be positioned to reflect and/or redirect heat radiated from the heating element 150 to the heating zone 64 and shield the first lighting element 142 and/or the second lighting element 144 from direct heat exposure from heat radiated by the heating element 150. During such shielding, the temperature of the first heat reflector 160 and the second heat reflector 170 may increase. The second standoffs 172 and the second air gap 176 may prevent conductive heat transfer between the second heat reflector 170 and the first heat reflector 160. The first standoffs 162 and the first air gap 166 may be positioned to prevent conductive heat transfer between the cover 120 and the first heat reflector 160. The third air gap 156 and the fourth air gap 158 may be positioned to prevent conductive heat transfer between the first heat reflector 160, the first lighting element 142, and the second lighting element 144. The first vents 122 and the second vents 124 may be positioned to provide a path along which heat radiated from the first heat reflector 160 escapes from the thermal cavity 130 to an external environment (e.g., due to heat rising from the first heat reflector 160 within the thermal cavity 130 of the cover 120, etc.). Such thermal isolation between the reflector assembly 152, the cover 120, the first lighting element 142, and the second lighting element 144 may thereby maintain the first light sources 146 and the second light sources 148 within a suitable operating temperature range for the operation thereof (e.g., to prevent premature failure, a suitable operating temperature range for LEDs, etc.).

Figure 13:
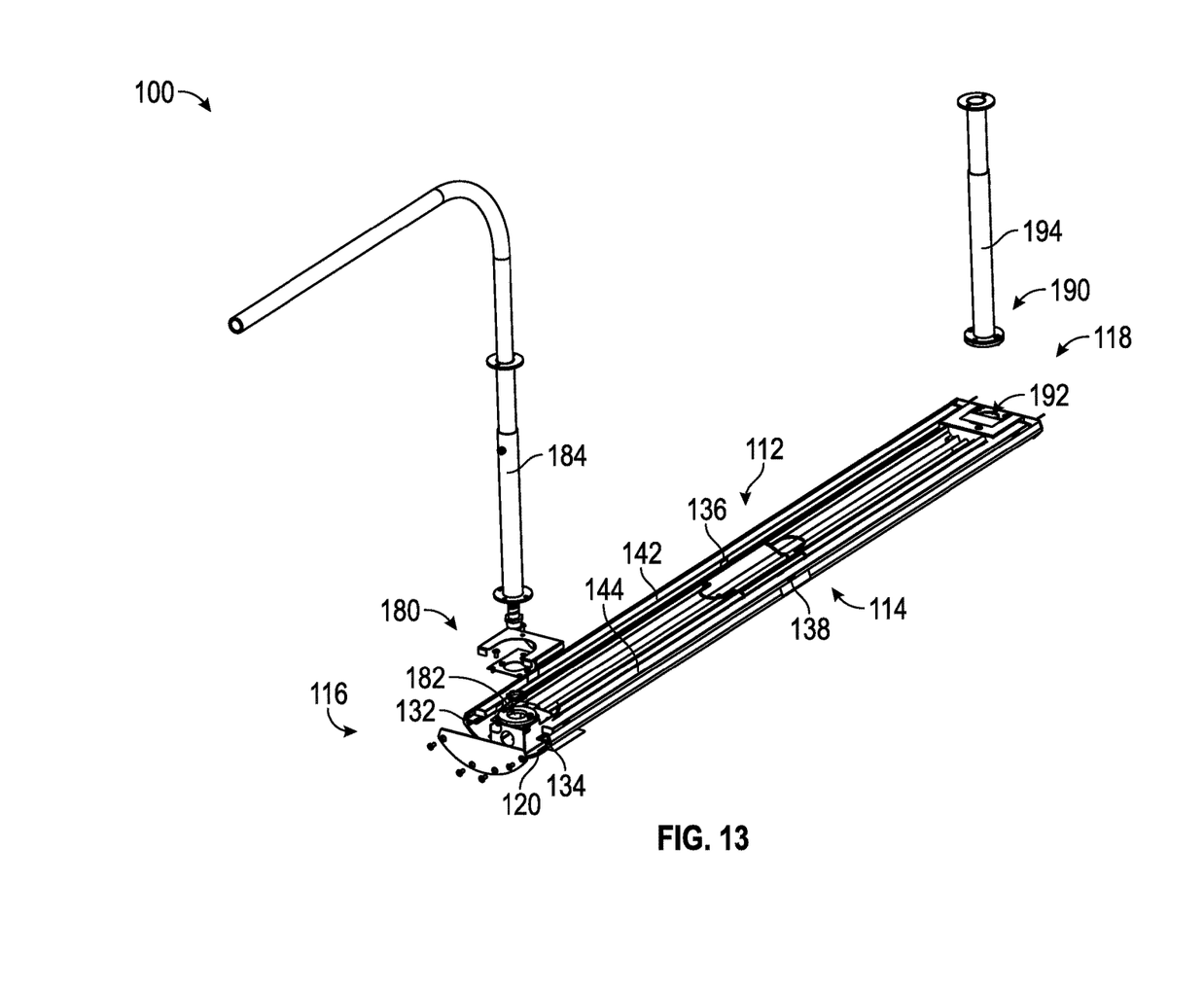
FIGS. 13 and 14 are bottom perspective views of the heating unit of FIG. 1, according to an exemplary embodiment.
Figure 14:
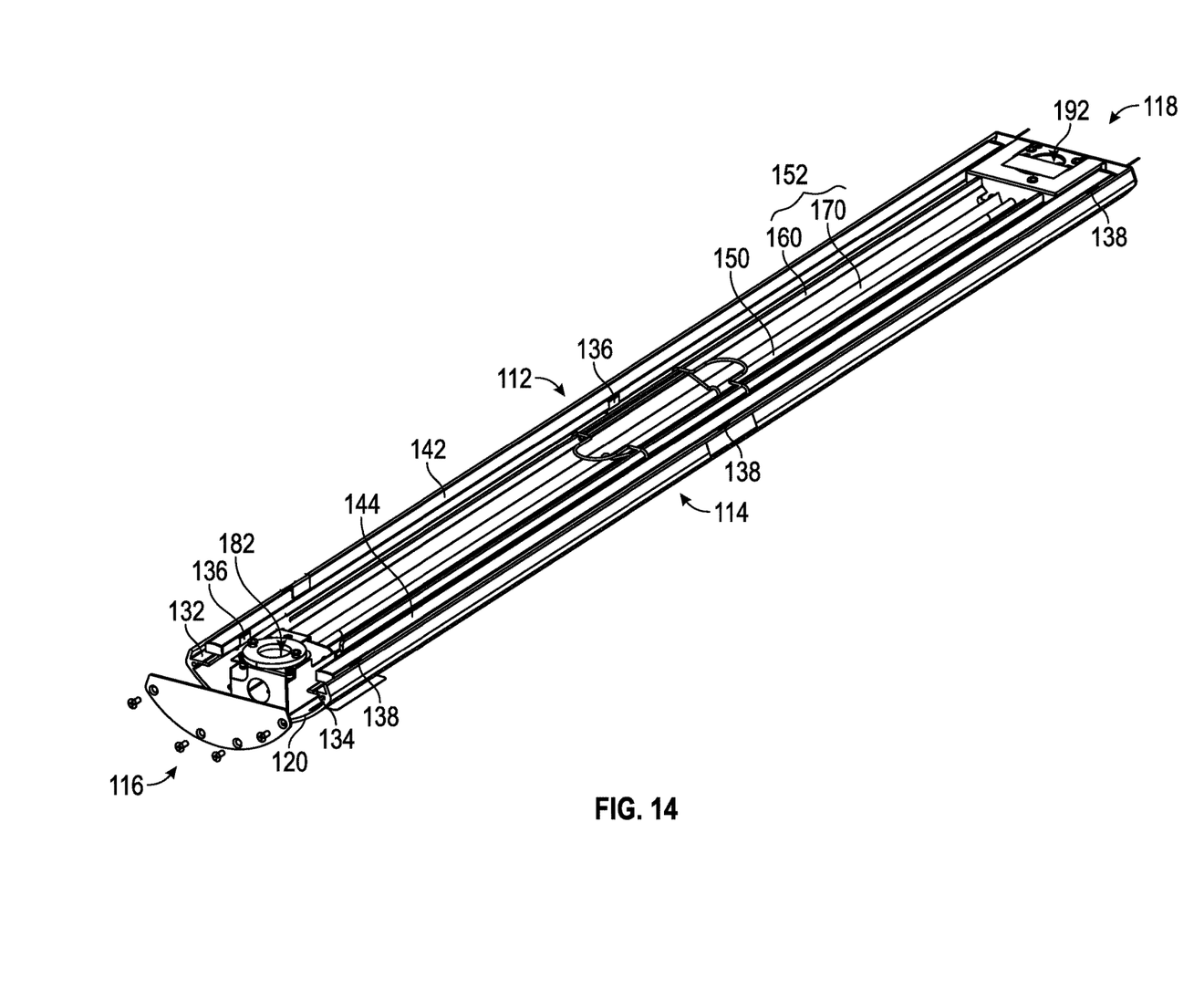

As shown in FIGS. 13 and 14, the warmer 100 includes a first power assembly, shown as heating power assembly 180, positioned at the first end 116 and a second power assembly, shown as lighting power assembly 190, positioned at the second end 118. According to an exemplary embodiment, the heating power assembly 180 includes first electrical wiring dedicated solely for powering the heating element 150 and the lighting power assembly 190 includes second electrical wiring dedicated solely for powering the first lighting element 142 and the second lighting element 144. As shown in FIGS. 13 and 14, the heating power assembly 180 includes a first electrical box, shown as heating electrical box 182, and a first wiring conduit, shown as heating wiring conduit 184. According to an exemplary embodiment, the heating wiring conduit 184 is configured to contain and direct the first electrical wiring (e.g., 120 volt ("V") wiring, 240 V wiring, etc.) to the heating electrical box 182, where the first electrical wiring couples to the heating element 150 and provides power thereto. As shown in FIGS. 13 and 14, the lighting power assembly 190 includes a second electrical box, shown as lighting electrical box 192, and a second wiring conduit, shown as lighting wiring conduit 194. According to an exemplary embodiment, the lighting wiring conduit 194 is configured to contain and direct the second electrical wiring (e.g., 12 V wiring, etc.) to the lighting electrical box 192 where the second electrical wiring couples to the first lighting element 142 and/or the second lighting element 144 to provide power thereto. In other embodiments, the first electrical wiring and/or the second electrical wiring are directed to the heating electrical box 182 and/or the lighting electrical box, respectively, through respective stands 104 of the warmer 100.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:
1. A heating unit, comprising:
   a housing defining a thermal cavity and having a first longitudinal edge and an opposing second longitudinal edge, the housing defining a vent positioned at least one of (i) laterally between a central longitudinal plane of the housing and the first longitudinal edge and (ii) laterally between the central longitudinal plane and the opposing second longitudinal edge;
   a reflector assembly disposed within the thermal cavity, the reflector assembly including:
      a first reflector coupled to the interior surface of the housing, wherein a first spacer is positioned between the first reflector and the interior surface forming a first air gap therebetween; and
      a second reflector coupled to the first reflector, wherein a second spacer is positioned between the second reflector and the first reflector forming a second air gap therebetween;
   a heating element extending within the central longitudinal plane and at least partially surrounded by the reflector assembly; and a lighting element positioned along at least one of (i) the first longitudinal edge and (ii) the opposing second longitudinal edge such that the vent is positioned laterally between the lighting element and the heating element.

2. The heating unit of claim 1, wherein the heating element is at least partially surrounded by the second reflector.

3. The heating unit of claim 1, wherein the housing includes a flange extending along at least one of the first longitudinal edge and the opposing second longitudinal edge.

4. The heating unit of claim 3, wherein the flange extends at least partially laterally inward from the at least one of the first longitudinal edge and the opposing second longitudinal edge towards the central longitudinal plane, defining a second air gap between the flange and the reflector assembly.

5. The heating unit of claim 3, wherein the lighting element is coupled to the flange.

6. The heating unit of claim 5, wherein the lighting element includes a plurality of light emitting diodes.

7. The heating unit of claim 3, wherein the flange is a first flange extending from the first longitudinal edge, the housing further comprising a second flange extending from the opposing second longitudinal edge.

8. The heating unit of claim 7, wherein the vent is a first vent positioned between the central longitudinal plane and the first longitudinal edge, the housing further defining a second vent positioned between the central longitudinal plane and the opposing second longitudinal edge.

9. The heating unit of claim 1, wherein the housing has a domed-shaped profile.

10. A heating unit, comprising:
a housing defining a thermal cavity;
a reflector assembly disposed within the thermal cavity, the reflector assembly including:
a first reflector coupled to the interior surface of the housing;
a first spacer positioned between the first reflector and the interior surface forming a first air gap therebetween;
a second reflector coupled to the first reflector; and
a second spacer positioned between the first reflector and the second reflector forming as second air gap therebetween;
a heating element disposed within the thermal cavity and at least partially surrounded by the reflector assembly; and
a lighting element at least partially disposed within the thermal cavity, the lighting element including a plurality of light emitting diodes.

11. The heating unit of claim 10, wherein the second reflector is disposed within a channel of the first reflector such that the first reflector at least partially surrounds the second reflector.

12. The heating unit of claim 11, wherein the heating element extends within a central longitudinal plane of the housing.

13. The heating unit of claim 12, wherein the housing includes a flange extending laterally inward from a longitudinal edge of the housing into the thermal cavity, wherein the lighting element is coupled to the flange.

14. The heating unit of claim 13, wherein the housing defines a vent positioned between the reflector assembly and the lighting element.

15. The heating unit of claim 14, wherein the vent includes a plurality of vents defined along a longitudinal length of the housing.

16. A heating unit, comprising:
a housing defining a central longitudinal plane, the housing including:
a cover having a first longitudinal edge and an opposing second longitudinal edge, the cover defining (i) a first vent positioned laterally between the central longitudinal plane and the first longitudinal edge and (ii) a second vent positioned laterally between the central longitudinal plane and the opposing second longitudinal edge;
a first flange extending along the first longitudinal edge; and
a second flange extending along the opposing second longitudinal edge;
a first reflector coupled to an interior surface of the cover, wherein a first plurality of spacers are positioned between the first reflector and the interior surface forming a first air gap therebetween;
a second reflector coupled to the first reflector, wherein a second plurality of spacers are positioned between the second reflector and the first reflector forming a second air gap therebetween;
a heating element extending within the central longitudinal plane and at least partially surrounded by the second reflector;
a first lighting element coupled to the first flange such that the first vent is positioned laterally between the first lighting element and the heating element; and
a second lighting element coupled to the second flange such that the second vent is positioned laterally between the second lighting element and the heating element.

17. The heating unit of claim 16, wherein the first flange extends at least partially laterally inward from the first longitudinal edge towards the central longitudinal plane, defining a third air gap between the first flange and the first reflector, and wherein the second flange extends at least partially laterally inward from the opposing second longitudinal edge towards the central longitudinal plane, defining a fourth air gap between the second flange and the first reflector.

* * * * *